US008853295B2

(12) United States Patent
Ludewig et al.

(10) Patent No.: US 8,853,295 B2
(45) Date of Patent: Oct. 7, 2014

(54) PROCESS FOR THE PREPARATION OF PARTICULARLY REACTIVE AND LOW-VISCOSITY ALLOPHANATES HAVING ACTINIC-CURABLE GROUPS AND THE USE THEREOF FOR THE PREPARATION OF PARTICULARLY SCRATCH-RESISTANT COATINGS

(75) Inventors: Michael Ludewig, Leverkusen (DE); Wolfgang Fischer, Meerbusch (DE); Helmut Kuczewski, Kamp-Lintfort (DE)

(73) Assignee: ALLNEX IP S.a.r.L., Luxembourg (LU)

( * ) Notice: Subject to any disclaimer, the term of this patent is extended or adjusted under 35 U.S.C. 154(b) by 347 days.

(21) Appl. No.: 12/704,749

(22) Filed: Feb. 12, 2010

(65) Prior Publication Data

US 2010/0204434 A1 Aug. 12, 2010

(30) Foreign Application Priority Data

Feb. 12, 2009 (DE) .......................... 10 2009 008 569

(51) Int. Cl.
C09D 175/16 (2006.01)
C08L 75/16 (2006.01)
C09J 175/16 (2006.01)
C07C 275/60 (2006.01)
C08G 18/67 (2006.01)

(52) U.S. Cl.
USPC .................. 522/174; 252/182.18; 252/182.2; 522/90; 522/96; 522/97; 523/115; 523/116; 525/123; 525/124; 525/125; 525/126; 525/127; 525/130; 525/453; 525/455; 525/457; 525/458; 525/460; 526/301; 526/302; 528/44; 528/45; 528/49; 528/59; 528/75; 560/330; 560/336; 560/355; 564/44; 564/45; 564/46

(58) Field of Classification Search
USPC ........ 522/90, 96, 97, 174; 525/123, 124, 125, 525/126, 127, 130, 453, 455, 457, 458, 525/460; 526/301, 302; 528/44, 45, 49, 59, 528/75; 560/330, 336, 355; 564/44, 45, 46; 523/115, 116; 252/182.18, 182.2
See application file for complete search history.

(56) References Cited

U.S. PATENT DOCUMENTS

| 3,640,967 | A | 2/1972 | Koenig et al. | |
|---|---|---|---|---|
| 4,160,080 | A | 7/1979 | Koenig et al. | |
| 4,808,691 | A | 2/1989 | Koenig et al. | |
| 5,596,065 | A | 1/1997 | Gerlitz et al. | |
| 5,672,736 | A | 9/1997 | Brahm et al. | |
| 5,739,251 | A * | 4/1998 | Venham et al. | 528/49 |
| 5,767,220 | A * | 6/1998 | Venham et al. | 528/49 |
| 5,777,024 | A | 7/1998 | Killilea et al. | |
| 5,917,083 | A | 6/1999 | Koenig et al. | |
| 6,392,001 | B1 | 5/2002 | Mertes et al. | |
| 6,617,413 | B1 | 9/2003 | Bruchmann et al. | |
| 7,323,532 | B2 | 1/2008 | Faecke et al. | |
| 7,361,723 | B2 | 4/2008 | Dètrembleur et al. | |
| 7,666,970 | B2 * | 2/2010 | Weikard et al. | 528/48 |
| 7,700,662 | B2 * | 4/2010 | Ludewig et al. | 522/90 |
| 7,902,315 | B2 * | 3/2011 | Weikard et al. | 528/73 |
| 7,960,446 | B2 * | 6/2011 | Detrembleur et al. | 522/90 |
| 8,071,659 | B2 * | 12/2011 | Ludewig et al. | 522/174 |
| 2003/0153713 | A1 | 8/2003 | Spyrou et al. | |
| 2006/0079660 | A1 | 4/2006 | Ludewig et al. | |
| 2007/0232751 | A1 * | 10/2007 | Ludewig et al. | 524/589 |
| 2009/0062500 | A1 | 3/2009 | Ludewig et al. | |
| 2009/0137750 | A1 | 5/2009 | Ludewig et al. | |

FOREIGN PATENT DOCUMENTS

| CA | 2253119 A1 | 5/1999 |
|---|---|---|
| DE | 1570540 A1 | 3/1970 |
| DE | 1770245 A1 | 10/1971 |
| DE | 2446440 A1 | 4/1976 |
| DE | 3717060 A1 | 12/1988 |
| DE | 19860041 A1 | 6/2000 |
| EP | 0000194 A1 | 1/1979 |
| EP | 0682012 A1 | 11/1995 |
| EP | 0694531 A2 | 1/1996 |
| EP | 0712840 A1 | 5/1996 |
| EP | 0825211 A1 | 2/1998 |
| EP | 0867457 A1 | 9/1998 |
| EP | 0916647 A2 | 5/1999 |
| EP | 1645582 A1 | 4/2006 |
| EP | 2031003 A1 | 3/2009 |
| EP | 2031005 A2 | 3/2009 |
| GB | 994890 A | 6/1965 |
| GB | 1462597 A | 1/1977 |
| WO | WO-2004/033522 A1 | 4/2004 |
| WO | WO-2005/092942 A1 | 10/2005 |

* cited by examiner

*Primary Examiner* — Rabon Sergent

(74) *Attorney, Agent, or Firm* — Drinker Biddle & Reath LLP

(57) ABSTRACT

The present invention relates to a process for the preparation of particularly reactive and low-viscosity reaction products of polyisocyanates which contain activated ethylenically unsaturated groups which react by polymerization under the action of actinic radiation, and the use of these reaction products in coating compositions, and particularly scratch-resistant coatings obtainable therefrom.

10 Claims, No Drawings

PROCESS FOR THE PREPARATION OF PARTICULARLY REACTIVE AND LOW-VISCOSITY ALLOPHANATES HAVING ACTINIC-CURABLE GROUPS AND THE USE THEREOF FOR THE PREPARATION OF PARTICULARLY SCRATCH-RESISTANT COATINGS

RELATED APPLICATIONS

This application claims benefit to German Patent Application No. 10 2009 008 569.6, filed Feb. 12, 2009, which is incorporated herein by reference in its entirety for all useful purposes.

BACKGROUND OF THE INVENTION

The present invention relates to a process for the preparation of particularly reactive and low-viscosity reaction products of polyisocyanates which contain activated ethylenically unsaturated groups which react by polymerization under the action of actinic radiation, and the use of these reaction products in coating compositions, and particularly scratch-resistant coatings obtainable therefrom.

In this connection, the term "reactive" relates to the reactivity with respect to curing by means of actinic radiation, i.e. to the tendency to crosslink under the influence of radiation.

Curing of coating systems carrying activated double bond by actinic radiation, such as e.g. UV light, IR radiation or also electron radiation, is known and is established in industry. It is one of the fastest methods of curing in coating technology. Coating compositions based on this principle are therefore called radiation- or actinic-curing or -curable systems.

Due to the ecological and economic requirements of modern lacquer systems of using as little organic solvent as possible or even no organic solvent to adjust the viscosity, there is the desire to use lacquer raw materials which are already low-viscosity. Polyisocyanates having an allophanate structure, such as are described inter alia in EP-A 0 682 012, have been known for this for a long time.

In industry, these are prepared by reaction of a mono- or polyhydric alcohol with large amounts of excess aliphatic and/or cycloaliphatic diisocyanate (cf. GB-A 994 890, EP-A 0 000 194 or EP-A 0 712 840). Unreacted diisocyanate is then removed by means of distilling off in vacuo. According to DE-A 198 60 041, this procedure can also be carried out with OH-functional compounds having activated double bonds, such as e.g. hydroxyalkyl acrylates, but difficulties occur in the preparation of products of particularly low monomer content. Since the distillation step must proceed at temperatures of up to 135° C. in order for the residual isocyanate content to be lowered sufficiently (<0.5 wt. % of residual monomer), during purification double bonds can already react by polymerization under thermal initiation, so that flawless products can no longer be obtained.

The preparation of allophanate-containing, radiation-curing polyurethane-based binders of low monomer content is described in EP-A 0 867 457 and U.S. Pat. No. 573,925. Nevertheless, these binders carry no activated double bonds, but unreactive allyl ether groups (structure R—O—CH$_2$—CH=CH$_2$). The addition of reactive diluents (low molecular weight esters of acrylic acid) which introduce the necessary UV reactivity is therefore required.

There has likewise been no lack of attempts to prepare allophanates indirectly from isocyanate derivates other than urethanes and isocyanates. EP-A 0 825 211 thus describes a process for building up allophanate structures from oxadiazinetriones, although no radiation-curing derivatives with activated double bonds are mentioned here. Application to the particular circumstances of radiation-curing systems is described in WO 2004/033522.

Another route is the opening of uretdiones (cf. Proceedings of the International Waterborne, High-Solids, and Powder Coatings Symposium 2001, 28$^{th}$, 405-419 and US-A 2003 0153713) to give allophanate structures, which it has likewise already been possible to apply successfully to radiation-curing systems (WO 2005/092942).

Both routes require refined raw materials as the starting material, and lead only to an allophanate product rich in by-products.

U.S. Pat. No. 5,777,024 describes the preparation of low-viscosity radiation-curing allophanates by a reaction of hydroxy-functional monomers which carry activated double bonds with isocyanate groups of allophanate-modified isocyanurate polyisocyanates. The radicals bonded via the allophanate groups are saturated here, as a result of which a possible higher functionality is eliminated.

EP-B 694 531 describes a multi-stage process for the preparation of hydrophilized allophanates having radiation-curing groups. In this, however, an NCO- and acrylate-functional urethane is first prepared, which is hydrophilized and, after addition of a further NCO- and acrylate-functional urethane, is then allophanated. Temperatures of 100-110° C. are stated as the process temperature for the allophanatization.

Finally, EP-A 1 645 582 described a process which leads to low-viscosity allophanates starting from simple diisocyanates by reaction with hydroxy-functional acrylates without distillation of the products. Nevertheless, a disadvantage of this process is that a satisfactory rate of reaction is to be achieved only with ammonium salts which are difficult to access. The viscosities of the products described are also not as low as e.g. the viscosities of the allophanates which are obtainable by the process described in EP-A 0 825 211. The reactivity furthermore is also in need of improvement.

Lower viscosities can be achieved in the method described in EP-A 1 645 582 by using a suitable basic zinc catalysis such as is described in EP-A 2 031 005. A further improvement in the viscosity can also be achieved if suitable blends of various hydroxyacrylates are used, as EP-A 2 031 003 teaches. Above all, the combination of the two processes leads to products with very low viscosities. Nevertheless, above all the scratch resistance of coating based on such binders is in need of improvement. The reactivity also cannot be increased in this way.

The object of the present invention was therefore to provide a process with which very low-viscosity allophanates which can be crosslinked by actinic radiation (radiation-curing allophanates) and have an increased reactivity can be provided, and to provide coating compositions based on these which lead to coatings having a particularly high scratch resistance.

EMBODIMENTS OF THE INVENTION

An embodiment of the present invention is a process for preparing a radiation-curable allophanate having a residual monomer content of less than 0.5 weight % and an NCO content of less than 1 weight %, comprising
(1) preparing a urethane comprising NCO and radiation-curable groups from
   A) a compound comprising NCO groups;
   B) a mixture comprising
     I) a hydroxyalkyl(meth)acrylate;
     II) a caprolactone-modified hydroxyalkyl(meth)acrylate; and III) a compound having a number average molecular weight of less than 1,000 g/mol comprising at least two (meth)acrylate groups and an OH group;
C) optionally a radiation-curable compound different from B) and which comprises NCO-reactive groups;
D) optionally a compound comprising NCO-reactive groups and free from radiation-curable groups; and
E) optionally in the presence of a catalyst and
(2) subsequently or simultaneously and without further addition of a compound comprising NCO groups, reacting said urethane comprising NCO and radiation-curable groups in the presence of
F) an allophanatization catalyst; and
G) optionally a tertiary amine;
to form an end product;
wherein the ratio of NCO groups of the compound of A) to the OH groups of the compound of B), optionally C), and optionally D) is in the range of from 1.45:1.0 to 1.1:1.0.

Another embodiment of the present invention is the above process, wherein component B) is a mixture of from 30 to 60 mol % of I), from 15 to 35 mol % of II), and from 15 to 35 mol % of III), with the proviso that in each case the sum of I), II), and III) is 100 mol % and the term mol in technical grade mixtures relates to the OH groups.

Another embodiment of the present invention is the above process, wherein I) comprises from 20 to 80 mol % of 2-hydroxyethyl acrylate and from 80 to 20 mol % of 2-hydroxypropyl acrylate, with the proviso that in each case the sum of said 2-hydroxyethyl acrylate and said 2-hydroxypropyl acrylate is 100 mol %.

Another embodiment of the present invention is the above process, wherein II) comprises 2-hydroxyethyl acrylate modified with ε-caprolactone.

Another embodiment of the present invention is the above process, wherein III) comprises pentaerythritol triacrylate.

Another embodiment of the present invention is the above process, wherein A) comprises hexamethylene-diisocyanate, isophorone-diisocyanate, and/or 4,4'-diiso-cyanatodicyclohexylmethane.

Another embodiment of the present invention is the above process, wherein the ratio of NCO groups of the compound of A) to the OH groups of the compound of B), optionally C), and optionally D) is in the range of from 1.35:1.0 to 1.3:1.0.

Another embodiment of the present invention is the above process, wherein (2) is carried out until said end product has an NCO content of less than 0.2 weight %.

Yet another embodiment of the present invention is a radiation-curable allophanate prepared by the above process.

Yet another embodiment of the present invention is a coating, lacquer, adhesive, printing ink, casting resin, dental composition, size, photoresist, stereolithography system, resin for composite materials, or sealing composition comprising the above radiation-curable allophanate.

Yet another embodiment of the present invention is a coating composition comprising
a) the above radiation-curable allophanate;
b) optionally a polyisocyanate with free or blocked isocyanate groups, which is free from groups which react with ethylenically unsaturated compounds by polymerization under the action of actinic radiation;
c) optionally a further compound different from a) which comprises groups which react with ethylenically unsaturated compounds by polymerization under the action of actinic radiation and optionally free or blocked NCO groups;
d) optionally a compound which reacts with isocyanates and contains active hydrogen
e) an initiator;
f) optionally a solvent; and
g) optionally one or more auxiliary substances and/or additives.

Yet another embodiment of the present invention is a substrate coated with a coating prepared from the above radiation-curable allophanate.

DESCRIPTION OF THE INVENTION

Starting from EP-A 1 645 582, it has now been found that a significant improvement in the reactivity and a further reduction in the viscosity of radiation-curing allophanates and a significant improvement in the scratch resistance of the coatings obtainable therefrom can be achieved if, in addition to a suitable mixture of hydroxyalkyl acrylates, caprolactone-modified hydroxyalkyl acrylates and hydroxy-acrylates which carry several acrylate groups are employed. It is to be evaluated as particularly surprising here that the highly viscosity-increasing effect of such polyfunctional acrylate mono-ols can be more than merely compensated by caprolactone-modified hydroxyalkyl acrylates without the reactivity of the allophanates and the scratch resistance and resistance of the coating obtainable with these being substantially impaired.

The invention therefore provides a process for the preparation of radiation-curing allophanates having residual monomer contents of less than 0.5 wt. % and an NCO content of less than 1 wt. %, in which, from
A) compounds containing isocyanate groups,
B) a mixture which comprises
    I) hydroxyalkyl(meth)acrylates,
    II) caprolactone-modified hydroxyalkyl(meth)acrylates and
    III) low molecular weight compounds (Mn<1,000 g/mol), which contain at least two (meth)acrylate groups in addition to an OH group,
C) optionally radiation-curing compounds which differ from B) and have NCO-reactive groups,
D) optionally compounds which have NCO-reactive groups and are free from radiation-curing groups,
E) optionally in the presence of a catalyst,
urethanes which contain NCO groups and have radiation-curing groups are formed, which are subsequently or simultaneously, without further addition of compounds containing isocyanate groups, reacted in the presence of
F) an allophanatization catalyst and
G) optionally a tertiary amine,
wherein the ratio of NCO groups of the compounds from A) to the OH groups of the compounds from B), optionally C) and optionally D) is 1.45:1.0 to 1.1:1.0.

The process according to the invention is advantageous if a mixture which comprises part I) to the extent of 30 to 60 mol %, part II) to the extent of 15 to 35 mol % and part III) to the extent of 15 to 35 mol % is employed in component B), with the proviso that in each case the sum of the three parts is 100 mol % and the term mol in technical grade mixtures relates to the OH groups.

The process according to the invention is advantageous if in component B) part I) comprises 2-hydroxyethyl acrylate to the extent of 20 to 80 mol % and 2-hydroxypropyl acrylate to the extent of 80 to 20 mol %, with the proviso that in each case the sum of the two parts is 100 mol %.

The process according to the invention is advantageous if component B) part III) comprises glycerol acrylate methacrylate and/or pentaerythritol triacrylate.

The process according to the invention is advantageous if hexamethylene-diisocyanate (HDI), isophorone-diisocyanate (IPDI) and/or 4,4'-diisocyanatodicyclohexylmethane are contained in component A).

The process according to the invention is advantageous if the ratio of NCO groups of the compounds from A) to the OH groups of the compounds from B), optionally C) and optionally D) is 1.35:1.0 to 1.3:1.0.

The process according to the invention is advantageous if the allophanatization is carried out until the end product has an NCO content of less than 0.2 wt. %.

The invention also provides radiation-curing allophanates obtainable by the process according to the invention.

The invention also provides the use of the radiation-curing allophanates obtainable by the process according to the invention for the preparation of coatings and lacquers as well as adhesives, printing inks, casting resins, dental compositions, sizes, photoresists, stereolithography systems, resins for composite materials and sealing compositions.

The invention also provides a coating composition comprising
a) one or more of the radiation-curing allophanates obtainable by the process according to the invention,
b) optionally one or more polyisocyanates with free or blocked isocyanate groups, which are free from groups which react with ethylenically unsaturated compounds by polymerization under the action of actinic radiation,
c) optionally further compounds, which differ from those from a), which contain groups which react with ethylenically unsaturated compounds by polymerization under the action of actinic radiation and optionally free or blocked NCO groups,
d) optionally one or more compounds which react with isocyanates and contain active hydrogen,
e) initiators,
f) optionally solvents and
g) optionally auxiliary substances and additives.

The invention also provides substrates coated with coatings which have been obtained with the aid of a radiation-curing allophanate obtainable by the process according to the invention.

Preferably, the ratio of NCO groups of the compounds from A) to the OH groups of the compounds from B), optionally C) and optionally D) is 1.43:1.0 to 1.2:1.0, particularly preferably 1.35:1.0 to 1.3:1.0.

Possible isocyanate-containing compounds A) are aromatic, aliphatic and cycloaliphatic polyisocyanates. Suitable polyisocyanates are compounds of the formula $Q(NCO)_n$ having an average molecular weight of less than 800, wherein n denotes a number from 2 to 4 and Q denotes an aromatic $C_6$-$C_{15}$-hydrocarbon radical, an aliphatic $C_4$-$C_{12}$-hydrocarbon radical or a cycloaliphatic $C_6$-$C_{15}$-hydrocarbon radical, for example diisocyanates from the series 2,4-/2,6-toluene-diisocyanate (TDI), methylen-ediphenyl-diisocyanate (MDI), triisocyanatononane (TIN), naphthyl-diisocyanate (NDI), 4,4'-diisocyanatodicyclohexylmethane, 3-isocyanatomethyl-3,3,5-trimethyl-cyclohexyl-isocyanate (isophorone-diisocyanate=IPDI), tetramethylene-diisocyanate, hexamethylene-diisocyanate (HDI), 2-methyl-pentamethylene-diisocyanate, 2,2,4-trimethylhexamethylene-4-diisocyanate (THDI), dodecamethylene-diisocyanate, 1,4-diisocyanato-cyclohexane, 4,4'-diisocyanato-3,3'-dimethyldicyclohexylmethane, 4,4'-diisocyanatodicyclohexyl-2,2-propane, 3-isocyanatomethyl-1-methyl-1-isocyanatocyclohexane (MCI), 1,3-diisooctylcyanato-4-methyl-cyclohexane, 1,3-diisocyanato-2-methyl-cyclohexane and $\alpha,\alpha,\alpha',\alpha'$-tetramethyl-m- or -p-xylylene-diisocyanate (TMXDI) and mixtures comprising these compounds.

Reaction products of the abovementioned isocyanates with themselves or with one another, e.g. to give uretdiones (such as e.g. Desmodur® N3400, Bayer MaterialScience, Leverkusen, DE) or isocyanurates (such as e.g. Desmodur® N3300 (higher viscosity type) or Desmodur® N3600 (lower viscosity type), both Bayer MaterialScience, Leverkusen, DE), are likewise suitable as isocyanate-containing compounds A.

Reaction products of the abovementioned isocyanates with other isocyanate-reactive compounds to give prepolymers are furthermore suitable as isocyanate-containing compounds A). Such isocyanate-reactive compounds are, above all, polyols, such as e.g. polyether polyols, polyester polyols, polycarbonate polyols and polyhydric alcohols. Higher molecular weight and, in a lesser amount, also low molecular weight hydroxy compounds can be employed as polyols.

The compounds of component A) can accordingly be employed directly in the process according to the invention, or are prepared by a preliminary reaction starting from any desired precursor before the process according to the invention is carried out.

The use of monomeric diisocyanates is preferred as component A). The use of hexamethylene-diisocyanate (HDI), isophorone-diisocyanate (IPDI) and/or 4,4'-diisocyanatodicyclohexylmethane is particularly preferred, and that of hexamethylene-diisocyanate (HDI) is very particularly preferred.

In the context of the present invention, radiation-curing groups are understood as meaning groups which react with ethylenically unsaturated compounds by polymerization under the action of actinic radiation. These are vinyl ether, maleyl, fumaryl, male imide, dicyclopentadienyl, acrylamide, acrylic and methacrylic groups, vinyl ether, acrylate and/or methacrylate groups being preferred and acrylate groups being particularly preferred.

Actinic radiation is understood as meaning electromagnetic ionizing radiation, in particular electron beams, UV rays and visible light (Roche Lexikon Medizin, 4th edition; Urban & Fischer Verlag, Munich 1999).

For the process according to the invention, a mixture of I) hydroxyalkyl (meth)acrylates, II) caprolactone-modified hydroxyalkyl(meth)acrylates and III) low molecular weight compounds (Mn<1,000 g/mol) which contain at least two (meth)acrylate groups in addition to an OH group is employed as component B).

Hydroxyalkyl(meth)acrylates (I) in the context of the present invention are compounds having a molecular weight (Mn) of less then 200 g/mol which also contain an acrylate group or a methacrylate group in addition to an OH group. There may be mentioned by way of example here 2-hydroxyethyl(meth)acrylate, 2-hydroxypropyl(meth)acrylate, 3-hydroxypropyl(meth)acrylate, 4-hydroxybutyl (meth)acrylate and 3-hydroxy-2,2-dimethylpropyl(meth)acrylate. 2-Hydroxyethyl (meth)acrylate and 2-hydroxypropyl(meth)acrylate are preferably employed, in this context 2-hydroxyethyl acrylate and 2-hydroxypropyl acrylate are particularly preferred, and mixtures of 2-hydroxyethyl acrylate and 2-hydroxypropyl acrylate are preferred in particular. Such mixtures preferably comprise 20 to 80 mol % of 2-hydroxyethyl acrylate and 80 to 20 mol % of 2-hydroxypropyl acrylate, particularly preferably 40 to 60 mol % of 2-hydroxyethyl acrylate and 60 to 40 mol % of 2-hydroxypropyl acrylate, with the proviso that the sum of 2-hydroxyethyl acrylate and 2-hydroxypropyl acrylate is 100 mol %.

Caprolactone-modified hydroxyalkyl(meth)acrylates (II) in the context of the present invention are hydroxyalkyl(meth)acrylates, preferably hydroxyalkyl acrylates, particularly preferably 2-hydroxyethyl acrylate, such as are described under I), which are reacted with ε-caprolactone in a ring-opening esterification. In this context, on average 1-20, preferably 1-8ε-caprolactone molecules are incorporated, so that a polyester-containing molecule with a hydroxyl group and a (meth)acrylate group, preferably an acrylate group, which has a molecular weight (Mn) of from 200 g/mol to 2,500 g/mol, preferably from 200 g/mol to 1,000 g/mol and very particularly preferably from 230 g/mol to 500 g/mol results. Such products are commercially obtainable, and there may be mentioned by way of example Tone M100® (Dow, Schwalbach, DE), Miramer M100® (Rahn AG, Zürich, CH), Pemcure 12a® (Cognis, Monheim, D) or SR 495 (Sartomer, Paris, FR).

Low molecular weight compounds (Mn<1,000 g/mol) (III) in the context of the present invention which contain at least two (meth)acrylate groups in addition to an OH group are products based on low molecular weight polyols, on to which on average at least two (meth)acrylates are attached by an ester bond. It is entirely possible here for these to be technical grade mixtures which also contain, as by-products, OH-free compounds, compounds with more than two OH groups or compounds with less than two acrylate groups. There may be mentioned by way of example glycerol di(meth)acrylate, trimethylolpropane di(meth)acrylate, pentaerythritol tri(meth)acrylate, di(trimethylolpropane) tri(meth)acrylate or di(pentaerythritol) penta(meth)acrylate. The corresponding ethoxylated or propoxylated types can likewise be used. Glycerol acrylate methacrylate, trimethylolpropane diacrylate, pentaerythritol triacrylate, di(trimethylolpropane) triacrylate or di(pentaerythritol) pentaacrylate are preferably used, the use of pentaerythritol triacrylate, glycerol acrylate methacrylate or mixtures of these two acrylates is particularly preferred, and the use of pentaerythritol triacrylate is very particularly preferred.

Component B) comprises 20 to 80 mol % of hydroxyalkyl (meth)acrylates (I), 10 to 50 mol % of caprolactone-modified hydroxyalkyl(meth)acrylates (II) and 10 to 50 mol % of low molecular weight compounds (Mn<1,000 g/mol) (III) which contain at least two (meth)acrylate groups, in addition to an OH group, preferably 30 to 60 mol % of I, 15 to 35 mol % of II and 15 to 35 mol % of III, with the proviso that the sum of the three components is in each case 100 mol % and in the case of technical grade mixture the term mol relates to the OH groups.

The constituents of component B) can be premixed for the synthesis, but are preferably metered successively into component A), the sequence being irrelevant.

In addition to the OH-functional unsaturated compounds of component B), it is conceivable, but not preferable, to employ in the process according to the invention further compounds C) which differ from B), can be cured under the action of actinic radiation and contain NCO-reactive groups, such as, for example, OH, SH or NH.

In the context of the present invention, compounds which can be employed as a component in C) are understood as meaning those which, in addition to one or more OH, SH or NH groups, also additionally contain one or more vinyl ether, maleyl, fumaryl, maleimide, dicyclopentadienyl or acrylamide groups Those compounds containing OH, SH or NH groups and acrylic or methacrylic groups which do not fall under the definitions of component B) can likewise be employed as component C).

Examples of suitable compounds of component C) containing hydroxyl groups are polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK) or hydroxybutyl vinyl ether.

Alcohols which are obtained from the reaction of acids containing double bonds with epoxide compounds which optionally contain double bonds are also likewise suitable as a constituent of C), thus e.g. the reaction products of (meth)acrylic acid and bisphenol A diglycidyl ether.

It is furthermore conceivable to employ polyesters which contain OH groups and unsaturated groups, for example those which contain maleic anhydride, maleic acid, fumaric acid or (meth)acrylic acid.

In addition to the OH-functional unsaturated compounds of components B) and optionally C), compounds D) which are not reactive under the action of actinic rays and contain NCO-reactive groups, such as, for example, OH, SH or NH, can also be employed in the process according to the invention.

Polyether polyols, polyester polyols, polycarbonate polyols and polyhydric alcohols, for example, can be co-used as component D) to influence the product properties. Higher molecular weight and, in a lesser amount, also low molecular weight hydroxy compounds can be employed as polyols.

Higher molecular weight hydroxy compounds include the conventional hydroxy-polyesters, hydroxy-polyethers, hydroxy-polythioethers, hydroxy-polyacetals, hydroxy-polycarbonates, dimer fatty alcohols and/or ester-amides in polyurethane chemistry, in each case having average molecular weights of from 400 to 8,000 g/mol, preferably those having average molecular weights of from 500 to 6,500 g/mol. Preferred higher molecular weight hydroxy compounds are hydroxy-polyethers, hydroxy-polyesters and hydroxy-polycarbonates.

The conventional polyols in polyurethane chemistry having molecular weight of from 62 to 399 can be used as low molecular weight polyhydroxy compounds, such as ethylene glycol, triethylene glycol, tetraethylene glycol, propane-1,2-diol and -1,3-diol, butane-1,4-diol and -1,3-diol, hexane-1,6-diol, octane-1,8-diol, neopentyl glycol, 1,4-bis(hydroxymethyl)cyclohexane, bis(hydroxymethyl)tricyclo[5.2.1.0$^{2.6}$] decane or 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol, butane-1,2,4-triol, pentaerythritol, quinitol, mannitol, sorbitol, methyl glycoside and 4,3,6-dianhydrohexitols.

Suitable polyether polyols are the conventional polyethers in polyurethane chemistry, such as e.g. the addition or mixed addition compounds of tetrahydrofuran, styrene oxide ethylene oxide, propylene oxide, the butylene oxides or epichlorohydrins, in particular of ethylene oxide and/or of propylene oxide, prepared using di- to hexafunctional starter molecules, such as water or the abovementioned polyols or amines containing 1 to 4 NH bonds. Propylene oxide polyethers containing on average 2 to 4 hydroxyl groups, which can contain up to 50 wt. % of incorporated polyethylene oxide units, are preferred.

Suitable polyester polyols are e.g. reaction products of polyhydric, preferably dihydric and optionally additionally trihydric alcohols with polybasic, preferably dibasic carboxylic acids. Instead of the free polycarboxylic acids, the corresponding polycarboxylic acid anhydrides or corresponding polycarboxylic acid esters of lower alcohols or mixtures thereof can also be used for preparation of the polyesters. The polycarboxylic acids can be aliphatic, cycloaliphatic, aromatic and/or heterocyclic in nature and can optionally be substituted, e.g. by halogen atoms, and/or unsaturated. Adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetrahydrophthalic acid anhydride, dimeric and trimeric fatty acids, such as oleic acid, optionally in a mixture with monomeric fatty acids, terephthalic acid dimethyl ester or terephthalic acid bis-glycol ester are mentioned by way of example. Hydroxy-polyesters which melt below 60° C. and have 2 or 3 terminal OH groups are preferred.

The possible polycarbonate polyols are obtainable by reaction of carbonic acid derivatives, e.g. diphenyl carbonate, dimethyl carbonate or phosgene, with diols. Possible such diols are e.g. ethylene glycol, triethylene glycol, tetraethylene glycol, propane-1,2-diol and -1,3-diol, butane-1,4-diol and -1,3-diol, pentane-1,5-diol, hexane-1,6-diol, octane-1,8-diol, neopentyl glycol, 1,4-bis(hydroxymethyl)cyclohexane, bis (hydroxymethyl)tricyclo[5.2.1.0$^{2.6}$]decane or 1,4-bis(2-hydroxyethoxy)benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A or mixtures of the diols mentioned. The diol component preferably comprises 40 to 100 wt. % of hexanediol, preferably hexane-1,6-diol, and/or hexanediol derivatives, preferably those which contain ether or ester groups in addition to terminal OH groups, e.g. products which have been obtained by reaction of 1 mol of hexanediol with at least 1 mol, preferably 1 to 2 mol of caprolactone in accordance with DE-A 1 770 245, or by etherification of hexanediol with itself to give di- or trihexylene glycol. The preparation of such derivatives is known e.g. from DE-A 1 570 540. The polyether-polycarbonate diols described in DE-A 3 717 060 can also be very readily employed.

The hydroxypolycarbonates should be substantially linear. However, they can also optionally be slightly branched by incorporation of polyfunctional components, in particular low molecular weight polyols. Trimethylolpropane, hexane-1,2,6-triol, glycerol, butane-1,2,4-triol, pentaerythritol, quinitol, mannitol, sorbitol, methyl glycoside and 4,3,6-dianhydrohexitols, for example, are suitable for this.

Groups having a hydrophilizing action can furthermore be incorporated, especially if a use from an aqueous medium, e.g. in an aqueous lacquer, is envisaged. Groups having a hydrophilizing action are ionic groups, which can be either cationic or anionic in nature, and/or nonionic hydrophilic groups. Compounds having a cationic, anionic or nonionic dispersing action are those which contain, for example, sulfonium, ammonium, phosphonium, carboxylate, sulfonate or phosphonate groups or groups which can be converted into the abovementioned groups by salt formation (potentially ionic groups), or polyether groups, and can be incorporated by the isocyanate-reactive groups present. Hydroxyl and amine groups are preferably suitable isocyanate-reactive groups.

Suitable compounds containing ionic or potentially ionic groups are e.g. mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and their salts, such as dimethylolpropionic acid, dimethylolbutyric acid, hydroxypivalic acid, N-(2-aminoethyl)-β-alanine, 2-(2-amino-ethylamino)-ethanesulfonic acid, ethylenedi-amine-propyl- or -butylsulfonic acid, 1,2- or 1,3-propylenediamine-β-ethylsulfonic acid, malic acid, citric acid, glycollic acid, lactic acid, glycine, alanine, taurine, lysine, 3,5-diaminobenzoic acid, an addition product of IPDI and acrylic acid (EP-A 0 916 647, Example 1) and alkali metal and/or ammonium salts thereof; the adduct of sodium bisulfite on but-2-ene-1,4-diol, polyether sulfonate, the propoxylated adduct of 2-butenediol and NaHSO$_3$, e.g. described in DE-A 2 446 440 (page 5-9, formula I-III) and units which can be converted into cationic groups, such as N-methyl-diethanolamine, as hydrophilic builder components. Preferred ionic or potentially ionic compounds are those which have carboxyl or carboxylate and/or sulfonate groups and/or ammonium groups. Particularly preferred ionic compounds are those which contain carboxyl and/or sulfonate groups as ionic or potentially ionic groups, such as the salts of N-(2-aminoethyl)-β-alanine, of 2-(2-amino-ethylamino)-ethanesulfonic acid or of the addition product of IPDI and acrylic acid (EP-A 0 916 647, Example 1) as well as of dimethylolpropionic acid.

Suitable compounds having a nonionic hydrophilizing action are e.g. polyoxyalkylene ethers which contain at least one hydroxyl or amino group. These polyethers contain a content of from 30 wt. % to 100 wt. % of units which are derived from ethylene oxide. Possible compounds are polyethers of linear structure having a functionality of between 1 and 3, and also compounds of the general formula (I)

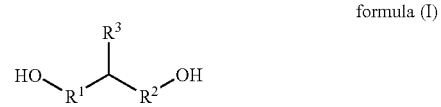

formula (I)

in which
R$^1$ and R$^2$ independently of each other each denote a divalent aliphatic, cycloaliphatic or aromatic radical having 1 to 18 C atoms, which can be interrupted by oxygen and/or nitrogen atoms, and
R$^3$ represents an alkoxy-terminated polyethylene oxide radical.

Compounds having a nonionic hydrophilizing action are also, for example, monofunctional polyalkylene oxide polyether alcohols containing, as a statistical average, 5 to 70, preferably 7 to 55 ethylene oxide units per molecule, such as are accessible in a manner known per se by alkoxylation of suitable starter molecules (e.g. in Ullmanns Encyclopädie der technischen Chemie, 4th edition, volume 19, Verlag Chemie, Weinheim p. 31-38).

Suitable starter molecules are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl-cyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyra-zole. Preferred starter molecules are saturated monoalcohols. Diethylene glycol monobutyl ether is particularly preferably used as the starter molecule.

Alkylene oxides which are suitable for the alkoxylation reaction are, in particular, ethylene oxide and propylene oxide, which can be employed in the alkoxylation reaction in any desired sequence or also in a mixture.

The polyalkylene oxide polyether alcohols are either pure polyethylene oxide polyethers or mixed polyalkylene oxide polyethers, the alkylene oxide units of which comprise ethylene oxide units to the extent of at least 30 mol %, preferably to the extent of at least 40 mol %. Preferred nonionic compounds are monofunctional mixed polyalkylene oxide polyethers which contain at least 40 mol % of ethylene oxide units and not more than 60 mol % of propylene oxide units.

In particular, if a hydrophilizing agent containing ionic groups is used, its influence on the action of the catalysts E) and above all F) must be checked. For this reason, nonionic hydrophilizing agents are preferred.

Possible compounds of the catalyst component E) are urethanation catalysts known per se to the person skilled in the art, such as organotin compounds, zinc compounds or aminic catalysts. Organotin compounds which may be mentioned by way of example are: dibutyltin diacetate, dibutyltin dilaurate, dibutyltin bis-acetoacetonate and tin carboxylates, such as, for example, tin octoate. The tin catalysts mentioned can optionally be used in combination with aminic catalysts, such as aminosilanes or 1,4-diazabicyclo[2.2.2]octane. Zinc acetylacetonate or zinc octoate e.g. can be employed as a zinc compound.

Dibutyltin dilaurate or zinc octoate are preferably employed as the urethanation catalyst in E).

In the process according to the invention, catalyst component E) is co-used, if at all, in amounts of 0.001-5.0 wt. %, preferably 0.001-0.1 wt. %, based on the solids content of the process product.

Allophanatization catalysts known per se to the person skilled in the art can be used as catalyst F), such as the zinc salts zinc octoate, zinc acetylacetonate and zinc 2-ethylcaproate, or tetraalkylammonium compounds, such as N,N,N-trimethyl-N-2-hydroxypropylammonium hydroxide or N,N,N-trimethyl-N-2-hydroxypropylammonium 2-ethylhexanoate, or choline 2-ethylhexanoate. The use of zinc octoate is preferred.

In this context, in the context of this invention the term zinc octoate is also understood as meaning technical grade isomer product mixtures which can also contain contents of zinc salts of $C_6$-$C_{19}$-fatty acids in addition to various isomeric octoates. Examples of preferred products which can be used are Borchi Kat 22 from Borchers GmbH, Langenfeld, DE or Tegokat® 620 from Goldschmidt GmbH, Essen, DE.

The allophanatization catalyst is employed in amounts of 0.001-5.0 wt. %, preferably 0.001-1.0 wt. % and particularly preferably 0.05-0.5 wt. %, based on the solids content of the process product.

In principle, the allophanatization catalyst F) can already be used for the urethanation reaction in E) and the two-stage procedure can be simplified to a one-stage reaction.

The catalyst F) can be added all at once in one portion or also in portions or also continuously. An addition all at once is preferred.

If the preferred zinc octoate is used as the allophanatization catalyst, the allophanatization reaction according to the teaching of EP-A 2 031 005 can proceed very slowly and often incompletely, so that in this case it is preferable to employ a tertiary amine as component G). Suitable tertiary amines preferably have at least nine carbon atoms, it being possible for them to contain both aromatic and aliphatic radicals, which can also be bridged to one another. The amines preferably contain no further functional groups. Examples of suitable compounds are N,N,N-benzyldimethylamine, N,N,N-dibenzylmethylamine, N,N,N-cyclohexyldimethylamine, N-methylmorpholine, N,N,N-tribenzylamine, N,N,N-tripropylamine, tributylamine, N,N,N-tripentylamine or N,N,N-trihexylamine. In this context, the use of N,N,N-benzyldimethylamine is preferred.

The tertiary amine, if co-used, is employed in amounts of 0.01-5.0 wt. %, preferably 0.01-1.0 wt. % and particularly preferably 0.05-0.5 wt. %, based on the solids content of the process product.

The allophanatization reaction is preferably carried out until the NCO content of the product is less than 0.5 wt. %, particularly preferably less than 0.2 wt. %.

It is in principle possible to react a residual content of NCO groups with NCO-reactive compounds, such as e.g. alcohols, when the allophanatization reaction has ended. Products with very particularly low NCO contents are thereby obtained.

It is also possible to apply the catalysts E) and/or F) to support materials by methods known to the person skilled in the art and to use them as heterogeneous catalysts.

Solvents or reactive diluents can optionally be employed at any desired point in the process according to the invention. However, this is not preferred.

Suitable solvents are inert towards the functional groups present in the process product from the point in time of addition to the end of the process. Solvents used in lacquer technology e.g. are suitable, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide and dimethylformamide, but preferably no solvent is added.

Compounds which likewise (co)polymerize during the UV curing and are thus co-incorporated into the polymer network and which are inert towards NCO groups can be co-used as reactive diluents. Such reactive diluents are described by way of example in P. K. T. Oldring (ed.), Chemistry & Technology of UV & EB Formulations For Coatings, Inks & Paints, vol. 2, 1991, SITA Technology, London, p. 237-285. These can be esters of acrylic acid or methacrylic acid, preferably of acrylic acid, with mono- or polyfunctional alcohols. Suitable alcohols are, for example, the isomeric butanols, pentanols, hexanols, heptanols, octanols, nonanols and decanols, and furthermore cycloaliphatic alcohols, such as isobornol, cyclohexanol and alkylated cyclohexanols, dicyclopentanol, arylaliphatic alcohols, such as phenoxyethanol and nonylphenylethanol, and tetrahydrofurfuryl alcohols. Alkoxylated derivatives of these alcohols can furthermore be used. Suitable dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or also alkoxylated derivatives of these alcohols. Preferred dihydric alcohols are hexane-1,6-diol, dipropylene glycol and tripropylene glycol. Suitable trihydric alcohols are glycerol or trimethylolpropane or alkoxylated derivatives thereof. Tetrahydric alcohols are pentaerythritol or alkoxylated derivatives thereof.

The binders according to the invention must be stabilized against premature polymerization. Stabilizers which inhibit polymerization are therefore added as a constituent of component A) or B) before and/or during the reaction. In this context, the use of phenothiazine is preferred. Other possible stabilizers are phenols, such as para-methoxyphenol, 2,5-di-tert-butylhydroquinone or 2,6-di-tent-butyl-4-methylphenol. N-Oxy compounds are also suitable for the stabilization, such as e.g. 2,2,6,6-tetramethylpiperidine N-oxide (TEMPO) or its derivatives. The stabilizers can likewise also be co-incorporated chemically into the binder, and in this context compounds of the abovementioned classes are suitable in particular if they also carry further free aliphatic alcohol groups or primary or secondary amine groups and therefore can be bonded chemically to compounds of component A) via urethane or urea groups. 2,2,6,6-Tetramethyl-4-hydroxy-piperidine N-oxide is particularly suitable for this.

Other stabilizers, such as e.g. compounds of the HALS (HALS=hindered amine light stabilizers) class, on the other hand, are less preferably employed in A) or B) since as is known they do not make such effective stabilizing possible, and rather can lead to a "creeping" free radical polymerization of unsaturated groups.

The stabilizers are to be chosen such that they are stable under the influence of the catalysts E) and F) and do not react with a component of the process according to the invention under the reaction conditions. This can lead to the loss of the stabilizing property.

An oxygen-containing gas, preferably air, can be passed into and/or over the reaction mixture to stabilize the reaction mixture, in particular the unsaturated groups against premature polymerization. It is preferable for the gas to have the lowest possible content of moisture, in order to prevent undesirable reaction in the presence of isocyanate.

As a rule, a stabilizer is added during the preparation of the binders according to the invention, and in order to achieve a long-term stability after-stabilizing is finally carried out again with a phenolic stabilizer, and the reaction product is optionally saturated with air.

The stabilizer component is typically employed in the process according to the invention in amounts of 0.001-5.0 wt. %, preferably 0.01-2.0 wt. % and particularly preferably 0.05-1.0 wt. %, based on the solids content of the process product.

The process according to the invention is carried out at temperatures of at most 100° C., preferably 20 to 100° C., particularly preferably from 40 to 100° C., in particular at 60 to 90° C.

It is irrelevant whether one or both stages of the process according to the invention is carried out continuously, e.g. in a static mixer, extruder or kneader, or discontinuously, e.g. in a stirred reactor.

The process according to the invention is preferably carried out in a stirred reactor. The course of the reaction can be monitored by suitable measuring equipment installed in the reaction vessel and/or with the aid of analyses on samples taken. Suitable methods are known to the person skilled in the art. They are, for example, viscosity measurements, measurements of the NCO content, the refractive index or the OH content, gas chromatography (GC), nuclear magnetic resonance spectroscopy (NMR), infra-red spectroscopy (IR) and near infra-red spectroscopy (NIR). IR monitoring of the free NCO groups present (for aliphatic NCO groups, band at approx. $\upsilon=2272$ cm$^{-1}$) and GC analyses for unreacted compounds from A), B), optionally C) and optionally D) are preferred.

The unsaturated allophanates obtainable by the process according to the invention, in particular those based on the HDI preferably employed, preferably have shear viscosities at 23° C. of ≤100,000 mPas, particularly preferably ≤50,000 mPas and in particular <30,000 mPas.

The unsaturated allophanates obtainable by the process according to the invention, in particular those based on the HDI preferably employed, preferably have number-average molecular weights $M_n$ of from 600 to 5,000 g/mol, particularly preferably 750 to 2,500 g/mol.

The unsaturated allophanates obtainable by the process according to the invention preferably have contents of free di- and triisocyanate monomers of less than 0.5 wt. %, particularly preferably less than 0.1 wt. %.

The radiation-curing allophanates according to the invention can be used for the preparation of coatings and lacquers as well as adhesives, printing inks, casting resins, dental compositions, sizes, photoresists, stereolithography systems, resins for composite materials and sealing compositions. In the case of gluing or sealing, nevertheless, it is a prerequisite that during curing by UV rays at least one of the two substrates to be glued or to be sealed with one another must be permeable to UV radiation, i.e. as a rule transparent. During radiation with electrons, an adequate permeability to electrons must be ensured. The use in lacquers and coatings is preferred.

The invention also provides coating compositions comprising
a) one or more of the radiation-curing allophanates according to the invention,
b) optionally one or more polyisocyanates with free or blocked isocyanate groups, which are free from groups which react with ethylenically unsaturated compounds by polymerization under the action of actinic radiation,
c) optionally further compounds, which differ from those from a), which contain groups which react with ethylenically unsaturated compounds by polymerization under the action of actinic radiation and optionally free or blocked NCO groups,
d) optionally one or more compounds which react with isocyanates and contain active hydrogen,
e) initiators,
f) optionally solvents and
g) optionally auxiliary substances and additives.

The polyisocyanates of component b) are known per se to the person skilled in the art. Compounds based on hexamethylene-diisocyanate, isophorone-diisocyanate, 4,4-diisocyanatodicyclohexylmethane and/or trimethylhexamethylene-diisocyanate optionally modified with isocyanurate, allophanate, biuret, uretdione and/or iminooxadiazinetrione groups are preferably used here.

In this context, the NCO groups can also be blocked, blocking agents employed being the compounds already mentioned in the description of component A).

The compounds of component c) include compounds such as, in particular, urethane acrylates, preferably based on hexamethylene-diisocyanate, isophorone-diisocyanate, 4,4'-diisocyanatodicyclohexylmethane and/or trimethylhexamethylene-diisocyanate, which can optionally be modified with isocyanurate, allophanate, biuret, uretdione and/or iminooxadiazinetrione groups, and which contain no functions which are reactive towards isocyanate groups and contain active hydrogen.

NCO-containing urethane acrylates are obtainable commercially from Bayer AG, Leverkusen, DE as Desmolux® D 100, Desmolux® VP LS 2396 or Desmolux® XP 2510.

The reactive diluents already described which are known in the art of radiation-curing coatings can furthermore be used as a constituent of c) if they contain no groups which are reactive with NCO groups.

Compounds of component d) can be saturated or unsaturated. Chemical functionalities which react with NCO groups are functionalities containing activated hydrogen atoms, such as hydroxyl, amine or thiol.

Saturated polyhydroxy compounds are preferred, e.g. the polyether polyols, polyester polyols, polycarbonate polyols, poly(meth)acrylate polyols and polyurethane polyols which are known per se from the technology of coating, gluing, printing inks or sealing compositions and contain no groups which react with ethylenically unsaturated compounds by polymerization under the action of actinic radiation.

Unsaturated hydroxy-functional compounds are e.g. the epoxyacrylates, polyester acrylates, polyether acrylates, urethane acrylates and acrylated polyacrylates known in the art of radiation-curing coatings which have an OH number of from 30 to 300 mg of KOH/g.

The reactive diluents already described which are known in the art of radiation-curing coatings can furthermore be used as a constituent of d) if they contain groups which are reactive with NCO groups.

Initiators which can be activated by radiation and/or thermally can be employed as initiators of component e) for a free radical polymerization. Photoinitiators which are activated by UV or visible light are preferred here. Photoinitiators are commercially marketed compounds which are known per se, a distinction being made between unimolecular (type I) and bimolecular (type II) initiators. Suitable (type I) systems are aromatic ketone compounds, e.g. benzophenones in combination with tertiary amines, alkylbenzophenones, 4,4'-bis (dimethylamino)benzophenone (Michler's ketone), anthrone and halogenated benzophenones or mixtures of the types mentioned. (Type II) initiators, such as benzoin and its derivatives, benzil ketals, acylphosphine oxides, e.g. 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable.

The initiators, which are employed in amounts of between 0.1 and 10 wt. %, preferably 0.1 to 5 wt. %, based on the weight of the lacquer binder, can be used as the individual substance or, because of frequent advantageous synergistic effects, also in combinations with one another.

If electron beams are used instead of UV radiation, no photoinitiator is required. Electron radiation, as is known to the person skilled in the art, is generated by means of thermal emission and accelerated via a potential difference. The high-energy electrons then break through a titanium film and are deflected to the binder to be cured. The general principles of electron beam curing are described in detail in "Chemistry & Technology of UV & EB Formulations for Coatings, Inks & Paints", vol. 1, P K T Oldring (Ed.), SITA Technology, London, England, p. 101-157, 1991.

In the case of thermal curing of the activated double bonds, this can also be carried out with addition of thermally dissociating agents which form free radicals. As is known to the person skilled in the art, suitable agents are e.g. peroxy compounds, such as dialkoxy dicarbonates, such as e.g. bis(4-tert-butylcyclohexyl) peroxydicarbonate, dialkyl peroxides, such as e.g. dilauryl peroxide, peresters of aromatic or aliphatic acids, such as e.g. tert-butyl perbenzoate or tert-amyl peroxy-2-ethylhexanoate, inorganic peroxides, such as e.g. ammonium peroxodisulfate or potassium peroxodisulfate, or organic peroxides, such as e.g. 2,2-bis(tert-butylperoxy)butane, dicumyl peroxide or tert-butyl hydroperoxide, or also azo compounds, such as 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide), 2,2'-azobis{2-methyl-N-[2-(1-hydroxybutyl))]propionamide}, 2,2'-azobis{2-methyl-N-[2-(1-hydroxybutyl)]propionamide and 2,2'-azobis{2-methyl-N-[1,1-bis(hydroxymethyl)-2-hydroxyethyl]propionamide. Highly substituted 1,2-diphenylethanes (benzopinacols), such as e.g. 3,4-dimethyl-3,4-diphenylhexane, 1,1,2,2-tetraphenyl-ethane-1,2-diol or also silylated derivatives thereof, are also possible.

It is also possible to use a combination of initiators which can be activated by UV light and those which can be activated thermally.

Component f) include solvents as for example hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide and dimethylformamide.

Furthermore, component g) can also contain UV absorbers and/or HALS stabilizers to increase the stability of the cured lacquer layer to weathering. The combination is preferred. The former should have an absorption range of not more than 390 nm, such as triphenyltriazine types (e.g. Tinuvin® 400 (Ciba Spezialitätenchemie GmbH, Lampertheim, DE)), benzotriazoles, such as Tinuvin® 622 (Ciba Spezialitätenchemie GmbH, Lampertheim, DE) or oxalic acid dianilides (e.g. Hostavin® 3206 (Clariant, Muttenz, CH)), and are added in amounts of 0.5-3.5 wt. %, based on the solid resin. Suitable HALS stabilizers are obtainable commercially (Tinuvin® 292 or Tinuvin® 123 (Ciba Spezialitätenchemie GmbH, Lampertheim, DE) or Hostavin® 3258 (Clariant, Muttenz, CH)). Preferred amounts are 0.5-2.5 wt. %, based on the solid resin.

Pigments, dyestuffs, fillers and flow and ventilating additives can likewise be contained in g).

If necessary, g) can moreover contain the catalysts known from polyurethane chemistry for accelerating the NCO/OH reaction. These are e.g. tin salts or zinc salts or organotin compounds, or tin soaps and/or zinc soaps, such as e.g. tin octoate, dibutyltin dilaurate or dibutyltin oxide, or tertiary amines, such as e.g. diazabicyclo[2,2,2]octane (DABCO).

The application of the coating compositions according to the invention to the material to be coated is carried out using the conventional and known methods in coating technology, such as spraying, knife-coating, rolling, pouring, dipping, whirler-coating, brushing or misting or by printing techniques, such as screen, gravure, flexographic or offset printing, and by transfer methods.

Suitable substrates are, for example, wood, metal, in particular also metal such as is used in the uses of so-called wire, coil, can or container lacquering, and furthermore plastic, also in the form of films, in particular ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PU, PVC, RF, SAN, PBT, PPE, POM, PU-RIM, SMC, BMC, PP-EPDM and UP (abbreviations according to DIN 7728T1), paper, leather, textiles, felt, glass, wood, wood materials, cork, inorganically bonded substrates, such as wood and fibre cement boards, electronic assemblies or mineral substrates. Substrates which comprise various of the abovementioned materials, or already coated substrates, such as vehicles, aircraft or ships and parts thereof, in particular vehicle bodies or attachments, can also be lacquered. It is also possible to apply the coating compositions only temporarily to a substrate and then to cure them partly or completely and optionally detach them again in order e.g. to produce films.

For curing, e.g. solvents present can be completely or partly removed by allowing to evaporate in air.

Thereafter or at the same time, the thermal process or processes which may be necessary and the photochemical curing process or processes can be carried out successively or simultaneously.

If necessary, the thermal curing can be carried out at room temperature, but also at elevated temperature, preferably at 40-160° C., more preferably at 60-130° C., particularly preferably at 80-110° C.

If photoinitiators are used in e), the radiation curing is preferably carried out by the action of high-energy radiation, that is to say UV radiation or daylight, e.g. light of wavelength 200 to 700 nm, or by irradiation with high-energy electrons (electron radiation, 150 to 300 keV). High or medium pressure mercury vapour lamps, for example, serve as radiation sources for light or UV light, it being possible for the mercury vapour to be modified by doping with other elements, such as gallium or iron. Lasers, pulsed lamps (known by the name UV flash lamps), halogen lamps or excimer lamps and LEDs which emit in the UV range are likewise possible. The lamps can be equipped as a result of their design or by the use of special filters and/or reflectors such that emission of a part of the UV spectrum is prevented. For example, for industrial hygiene reasons e.g. the radiation assigned to UV-C or UV-C and UV-B can be filtered out. The lamps can be installed in a fixed position, so that the goods to be irradiated are passed by the radiation source by means of a mechanical device, or the lamps can be movable and the goods to be irradiated do not change their position during curing. The radiation dose conventionally sufficient for crosslinking in UV curing is in the range of from 80 to 5,000 mJ/cm$^2$.

The irradiation can optionally also be carried out with exclusion of oxygen, e.g. under an inert gas atmosphere or oxygen-reduced atmosphere. Suitable inert gases are, preferably, nitrogen, carbon dioxide, noble gases or combustion gases. The irradiation can furthermore be carried out by covering the coating with media which are transparent for the radiation. Examples of these are e.g. films of plastic, glass, or liquids, such as water.

The type and concentration of the initiator optionally used are to be varied in a manner known to the person skilled in the art, depending on the radiation dose and curing conditions.

High pressure mercury lamps in installations of fixed position are particularly preferably employed for the curing. Photoinitiators are then employed in concentrations of from 0.1 to 10 wt. %, particularly preferably 0.2 to 3.0 wt. %, based on the solids of the coating. For curing these coatings, a dose of from 20 to 3,000 mJ/cm$^2$, preferably from 80 to 1,500 mJ/cm$^2$, measured in the wavelength range of from 200 to 600 nm, is preferably used.

If thermally activatable initiators are used in e) by increasing the temperature. In this context, the thermal energy can be introduced into the coating by radiation, thermal conduction and/or convection, the infra-red lamps, near infra-red lamps and/or ovens customary in coating technology being employed.

The layer thicknesses applied (before curing) are typically between 0.5 and 5,000 µm, preferably between 5 and 1,000 µm, particularly preferably between 15 and 200 µm. If solvents are used, this is removed by the usual methods after the application and before the curing.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless stated otherwise, all the percentage data relate to percent by weight.

The determination of the NCO contents in % was carried out via back-titration with 0.1 mol/l of hydrochloric acid after reaction with butylamine, on the basis of DIN EN ISO 11909.

The viscosity measurements were carried out with a plate/plate rotary viscometer, RotoVisko 1 from Haake, DE, with a shear rate of 47.94/s in accordance with ISO/DIS 3219:1990.

The ambient temperature of 23° C. prevailing at the time the experiments were carried out is called RT.

Example 1

Allophanate-containing binder according to the invention (NCO/OH=1.33:1, 25 mol % of 2-hydroxyethyl acrylate, 25 mol % of 2-hydroxypropyl acrylate, 16.7 mol % of pentaerythritol triacrylate, 33.3 mol % of caprolactone-modified 2-hydroxyethyl acrylate)

157.58 g of hexamethylene-diisocyanate (Desmodur® H, Bayer MaterialScience, Leverkusen) and 50 mg of phenothiazine were initially introduced into a 1,000 ml four-necked round-bottomed flask with a reflux condenser, heatable oil bath, mechanical stirrer, line for passing air through (1 l/h), internal thermometer and dropping funnel and were heated to 70° C. 3.00 g of zinc octoate (Borchi Kat 22 from Borchers GmbH, Langenfeld, DE) were added and first 161.15 g of Tone M100® (Dow, Schwalbach, DE), then 40.80 g of hydroxyethyl acrylate, furthermore 91.25 g of pentaerythritol triacrylate (2885(PETIA), AgiSyn®, Taipei, TW) and finally 45.67 g of hydroxypropyl acrylate were added dropwise such that the temperature of 80° C. was not exceeded. After addition of 6.90 g of N,N-dimethylbenzylamine, the mixture was stirred at 80° C. until the NCO content had fallen below 0.2% (about 18 hours). Finally, 0.5 g of 2,6-di-tert-butyl-4-methylphenol was admixed as a stabilizer. A yellowish resin with a residual NCO content of 0% and a viscosity of 16,500 mPas (23° C.) was obtained.

Example 2

Allophanate-containing binder according to the invention (NCO/OH=1.33:1, 33 mol % of 2-hydroxyethyl acrylate, 33 mol % of 2-hydroxypropyl acrylate, 17 mol % of pentaerythritol triacrylate, 17 mol % of caprolactone-modified 2-hydroxyethyl acrylate)

708.96 g of hexamethylene-diisocyanate (Desmodur® H, Bayer MaterialScience, Leverkusen) and 0.2 g of phenothiazine were initially introduced into a 3,000 ml four-necked round-bottomed flask with a reflux condenser, heatable oil bath, mechanical stirrer, line for passing air through (3 l/h), internal thermometer and dropping funnel and were heated to 70° C. 12.01 g of zinc octoate (Borchi Kat 22 from Borchers GmbH, Langenfeld, DE) were added and first 362.92 g of Tone M100® (Dow, Schwalbach, DE), then 244.97 g of hydroxyethyl acrylate, furthermore 411.01 g of pentaerythritol triacrylate (2885(PETIA), AgiSyn®, Taipei, TW) and finally 274.51 g of hydroxypropyl acrylate were added dropwise such that the temperature of 80° C. was not exceeded. After addition of 14.1 g of N,N-dimethylbenzylamine, the mixture was stirred at 80° C. until the NCO content had fallen below 0.2% (about 19 hours). Finally, 2.0 g of 2,6-di-tert-butyl-4-methylphenol were admixed as a stabilizer. An almost colourless resin with a residual NCO content of 0% and a viscosity of 25,000 mPas (23° C.) was obtained.

Comparison Example 1

Allophanate-containing binder not according to the invention, only hydroxyalkyl acrylate (NCO/OH=1.33:1, 20 mol % of 2-hydroxyethyl acrylate, 80 mol % of 2-hydroxypropyl acrylate)

470.4 g of hexamethylene-diisocyanate (Desmodur® H, Bayer MaterialScience, Leverkusen) and 100 mg of phenothiazine were initially introduced into a 2,000 ml sulfonating beaker with a reflux condenser, heatable oil bath, mechanical stirrer, line for passing air through (2 l/h), internal thermometer and dropping funnel and were heated to 70° C. 50 mg of dibutyltin dilaurate (Desmorapid Z, Bayer MaterialScience, Leverkusen) were added and first 437.14 g of hydroxypropyl acrylate and then 97.52 g of hydroxyethyl acrylate were added dropwise such that the temperature of 80° C. was not exceeded. The mixture was subsequently stirred until the theoretical NCO value of 5.83% was reached. 3.98 g of N,N-dimethylbenzylamine were then added and the mixture was stirred for about 5 minutes until it was homogenized. 3.02 g of zinc octoate (Borchi Kat 22 from Borchers GmbH, Langenfeld, DE) were then admixed and the mixture was stirred at 80° C. until the NCO content had fallen below 0.2% (about 20 hours). A colourless resin with a residual NCO content of 0.11% and a viscosity of 34,200 mPas (23° C.) was obtained.

Comparison Example 2

Allophanate-containing binder not according to the invention, only hydroxyalkyl acrylate with caprolactone-modified hydroxypropyl acrylate, without monohydroxy-oligoacrylate (NCO/OH=1.33:1, 33 mol % of 2-hydroxypropyl acrylate, 67 mol % of caprolactone-modified 2-hydroxyethyl acrylate)

582.29 g of hexamethylene-diisocyanate (Desmodur® H, Bayer MaterialScience, Leverkusen) and 0.2 g of phenothiazine were initially introduced into a 3,000 ml four-necked round-bottomed flask with a reflux condenser, heatable oil bath, mechanical stirrer, line for passing air through (3 l/h), internal thermometer and dropping funnel and were heated to 70° C. 6.0 g of zinc octoate (Borchi Kat 22 from Borchers GmbH, Langenfeld, DE) were added and first 1,192.30 g of Tone M100® (Dow, Schwalbach, DE) and then 225.29 g of hydroxypropyl acrylate were added dropwise such that the temperature of 80° C. was not exceeded. After addition of 4.91 g of N,N-dimethylbenzylamine, the mixture was stirred at 80° C. until the NCO content had fallen below 0.2% (about 24 hours). Finally, 2.0 g of 2,6-di-tert-butyl-4-methylphenol were admixed as a stabilizer. A colourless resin with a residual NCO content of 0% and a viscosity of 7,220 mPas (23° C.) was obtained.

Comparison Example 3

Allophanate-containing binder not according to the invention, only hydroxyalkyl acrylates with monohydroxy-oligoacrylate, without caprolactone-modified hydroxyethyl acrylate (NCO/OH=1.33:1, 33 mol % of 2-hydroxyethyl acrylate, 50 mol % of 2-hydroxypropyl acrylate, 17 mol % of PETIA)

198.26 g of hexamethylene-diisocyanate (Desmodur® H, Bayer MaterialScience, Leverkusen) and 50 mg of phenothiazine were initially introduced into a 1,000 ml four-necked round-bottomed flask with a reflux condenser, heatable oil bath, mechanical stirrer, line for passing air through (1 l/h), internal thermometer and dropping funnel and were heated to 70° C. 30 mg of dibutyltin dilaurate were added and first 68.44 g of hydroxyethyl acrylate, then 128.09 g of pentaerythritol triacrylate (2885(PETIA), AgiSyn®, Taipei, TW) and finally 114.93 g of hydroxypropyl acrylate were added dropwise such that the temperature of 80° C. was not exceeded. After addition of 3.05 g of N,N-dimethylbenzylamine and 3.06 g of zinc octoate (Borchi Kat 22 from Borchers GmbH, Langenfeld, DE), the mixture was stirred at 80° C. until the NCO content had fallen below 0.2% (about 18 hours). Finally, 0.5 g of 2,6-di-tert-butyl-4-methylphenol were admixed as a stabilizer. A yellowish resin with a residual NCO content of 0% and a viscosity of 45,200 mPas (23° C.) was obtained.

Example 5

Lacquer Formulation and Use Testing of the Lacquer

In each case a part of the products from all the examples and comparison examples was mixed with 3.0% of the photoinitiator Darocur® 1173 (photoinitiator, commercial product of Ciba Spezialitätenchemie GmbH, Lampertheim, DE) and 0.3% % Byk® 306 (Byk Chemie GmbH, Wesel).

The reactivity (1) was determined by applying 250 g/m² of lacquer to coloured cardboard. These cardboards were irradiated with various does of UV radiation (medium pressure mercury lamp, SUPERFICI/ELMAG, It, type: TU-RE 3000 PLUS, 700 mJ/cm²), and the dose up to which the colour of the cardboard could not be wiped away by wiping 100 times with butyl acetate (contact weight 1 kg) was determined (rubbing through of the lacquer). A low dose here represents a high reactivity of the lacquer.

To test the scratch resistance (2) and pendulum hardness (3), the lacquer was applied to an MDF board as a thin film by means of a bone knife with a gap of 120 μm. After UV irradiation (medium pressure mercury lamp, SUPERFICI/ELMAG, It, type: TU-RE 3000 PLUS, 700 mJ/cm²), transparent hard coatings were obtained. The pendulum hardness was determined on these by means of a pendulum apparatus (type 5854, Byk Gardner). The scratch resistance of the film was then also determined by first determining the gloss at 60° by means of a gloss measuring apparatus (MicroTriGloss, type 4520, Byk Gardner). A hammer weighing 800 g (contact area 25×25 mm), on to which a Scotch Brite® grey (type S, grade SFN) was fixed, was then pushed back and forth over the lacquer fifty times, before a gloss measurement was carried out again. The scratch resistance value indicates what percentage of the original gloss is still present after the scratching. In this context, a value of more than 70% can be regarded as very good for a pure binder.

The results of the use testing are summarized in the following table:

|  |  | Ex. 1 | Ex. 2 | Comp. Ex. 1 | Comp. Ex. 2 | Comp. Ex. 3 |
|---|---|---|---|---|---|---|
| Hydroxyalkyl acrylate | component | 50% | 66% | 100% | 33% | 83% |
| Caprolactone-modified hydroxyalkyl acrylate | B) in mol % (based on | 33% | 17% | 0% | 67% | 0% |
| Monohydroxy-oligoacrylate | OH groups) | 17% | 17% | 0% | 0% | 17% |
| Viscosity (binder) | [mPas] at 23° C. | 16,500 | 25,000 | 34,200 | 7,220 | 45,200 |

-continued

|  |  | Ex. 1 | Ex. 2 | Comp. Ex. 1 | Comp. Ex. 2 | Comp. Ex. 3 |
|---|---|---|---|---|---|---|
| Resistance up to the dose of (1)* | [mJ/cm$^2$] | 150 | 125 | 255 | 440 | 125 |
| Scratch resistance (2) | residual gloss in % | 91% | 83% | 37% | 27% | 80% |
| Pendulum hardness (3) | [s] | 160 | 155 | 165 | 50 | 171 |

*the smaller the dose, the higher the reactivity

SUMMARY

It can be clearly seen that only the lacquers based on binders according to the invention have an optimum profile of properties with respect to the viscosity, reactivity, scratch resistance and pendulum hardness. If caprolactone-modified hydroxyalkyl acrylate and monohydroxy-oligoacrylate are omitted (Comparison Example 1), lacquerings which have a higher viscosity and a deficient scratch resistance under high mechanical stress and are significantly less reactive than the binders according to the invention result. Only the modification with caprolactone-modified hydroxyalkyl acrylate (Comparison Example 2) can indeed lower the viscosity significantly, but in return the pendulum hardness collapses completely, so that only a rubber-like coating is obtained (it is to be noted that for many coating uses only lacquers with pendulum hardnesses of >80 s can be used). Modification solely with monohydroxy-oligoacrylate (Comparison Example 3), on the other hand, leads to a significantly higher viscosity. It must be evaluated as extremely surprising that the combination of the constituents has an exclusively positive effect on all the properties, and even results in the highest value with respect to that of the scratch resistance.

The invention claimed is:

1. A process for preparing a radiation-curable allophanate having a residual monomer content of less than 0.5 weight % and an NCO content of less than 1 weight %, comprising
    (1) preparing a urethane comprising NCO and radiation-curable groups from
        A) a compound comprising NCO groups;
        B) a mixture comprising
            I) from 30 to 60 mol %, wherein mol % refers to the mol % of OH groups based on the total OH groups in component B), of from 20 to 80 mol % of 2-hydroxyethyl acrylate and from 80 to 20 mol % of 2-hydroxypropyl acrylate, with the proviso that the sum of said 2-hydroxyethyl acrylate and said 2-hydroxypropyl acrylate is 100 mol %;
            II) from 15 to 35 mol %, wherein mol % refers to the mol % of OH groups based on the total OH groups in component B), of 2-hydroxyethyl acrylate modified with ε-caprolactone; and
            III) from 15 to 35 mol %, wherein mol % refers to the mol % of OH groups based on the total OH groups in component B), of pentaerythritol triacrylate; with the proviso that the sum of I), II), and III) is 100 mol %;
        C) optionally a radiation-curable compound different from B) and which comprises NCO-reactive groups;
        D) optionally a compound comprising NCO-reactive groups and free from radiation-curable groups; and
        E) optionally in the presence of a catalyst and
    (2) subsequently or simultaneously and without further addition of a compound comprising NCO groups, reacting said urethane comprising NCO and radiation-curable groups in the presence of
        F) an allophanatization catalyst; and
        G) optionally a tertiary amine;
    to form an end product;
    wherein the allophanatization catalyst is from 0.05 to 0.5 weight % based on the solids content of the end product,
    wherein the allophanatization catalyst is selected from the group consisting of zinc octoate, zinc acetylacetonate and zinc 2-ethylcaproate;
    wherein the ratio of NCO groups of the compound of A) to the OH groups of the compound of B), optionally C), and optionally D) is in the range of from 1.45:1.0 to 1.1:1.0;
    and wherein the radiation-curable allophanate has a shear viscosity at 23° C. of <30,000 mPas.

2. The process of claim 1, wherein A) comprises hexamethylene-diisocyanate, isophorone-diisocyanate, and/or 4,4'-diisocyanatodicyclohexylmethane.

3. The process of claim 1, wherein the ratio of NCO groups of the compound of A) to the OH groups of the compound of B), optionally C), and optionally D) is in the range of from 1.35:1.0 to 1.3:1.0.

4. The process of claim 1, wherein (2) is carried out until said end product has an NCO content of less than 0.2 weight %.

5. The process of claim 1, wherein the amount of catalyst E) is from 0.001 to 0.1 weight % based on the solids content of the end product.

6. The process of claim 1, wherein B) is a mixture comprising
    I) from 50 to 60 mol %, wherein mol % refers to the mol % of OH groups based on the total OH groups in component B), of from 20 to 80 mol % of 2-hydroxyethyl acrylate and from 80 to 20 mol % of 2-hydroxypropyl acrylate, with the proviso that the sum of said 2-hydroxyethyl acrylate and said 2-hydroxypropyl acrylate is 100 mol %;
    II) from 17 to 33 mol %, wherein mol % refers to the mol % of OH groups based on the total OH groups in component B), of 2-hydroxyethyl acrylate modified with ε-caprolactone; and
    III) from 15 to 35 mol %, wherein mol % refers to the mol % of OH groups based on the total OH groups in component B), of pentaerythritol triacrylate;
    with the proviso that the sum of I), II), and III) is 100 mol %.

7. A radiation-curable allophanate prepared by the process of claim 1.

8. A coating, lacquer, adhesive, printing ink, casting resin, dental composition, size, photoresist, stereolithography system, resin for composite materials, or sealing composition comprising the radiation-curable allophanate of claim 7.

9. A coating composition comprising
    a) the radiation-curable allophanate of claim 7;
    b) optionally a polyisocyanate with free or blocked isocyanate groups, which is free from groups which react with ethylenically unsaturated compounds by polymerization under the action of actinic radiation;

c) optionally a further compound different from a) which comprises groups which react with ethylenically unsaturated compounds by polymerization under the action of actinic radiation and optionally free or blocked NCO groups;
d) optionally a compound which reacts with isocyanates and contains active hydrogen
e) an initiator;
f) optionally a solvent; and
g) optionally one or more auxiliary substances and/or additives.

10. A substrate coated with a coating prepared from the radiation-curable allophanate of claim 7.

* * * * *